(12) United States Patent
Prokoph et al.

(10) Patent No.: US 11,281,704 B2
(45) Date of Patent: Mar. 22, 2022

(54) MERGING SEARCH INDEXES OF A SEARCH SERVICE

(71) Applicant: International Business Machines Corporation, Armonk, NY (US)

(72) Inventors: Andreas Prokoph, Boeblingen (DE); Timo Kussmaul, Boeblingen (DE); Thomas Stober, Herrenberg (DE); Uwe Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 16/289,251

(22) Filed: Feb. 28, 2019

(65) Prior Publication Data

US 2020/0278988 A1   Sep. 3, 2020

(51) Int. Cl.
| | | |
|---|---|---|
| G06F 7/00 | (2006.01) | |
| G06F 16/33 | (2019.01) | |
| G06F 16/901 | (2019.01) | |
| H04L 29/06 | (2006.01) | |
| G06F 9/455 | (2018.01) | |
| G06F 16/31 | (2019.01) | |

(52) U.S. Cl.
CPC ...... *G06F 16/3331* (2019.01); *G06F 9/45558* (2013.01); *G06F 16/328* (2019.01); *G06F 16/9024* (2019.01); *H04L 63/104* (2013.01); *G06F 2009/45579* (2013.01)

(58) Field of Classification Search
CPC ............. G06F 16/3331; G06F 16/328; G06F 16/9024; G06F 9/45558; G06F 2009/45579; H04L 63/104
See application file for complete search history.

(56) References Cited

U.S. PATENT DOCUMENTS

| | | | |
|---|---|---|---|
| 8,468,146 B2 | 6/2013 | Bhose et al. | |
| 8,843,507 B2 | 9/2014 | Xiao et al. | |
| 10,263,908 B1* | 4/2019 | Ganjoo | ............... H04L 47/76 |
| 2011/0282839 A1 | 11/2011 | Paksoy et al. | |
| 2017/0177733 A1 | 6/2017 | Meyerzon et al. | |
| 2017/0373945 A1* | 12/2017 | Chrysanthakopoulos | ............... G06F 3/064 |

(Continued)

OTHER PUBLICATIONS

Li et al., "Research on Multi-Tenant Distributed Indexing for SAAS Application," https://pdfs.semanticscholar.org/3982/c172403465e64e8b59b38fb721ea869f817c.pdf, Journal of Software, vol. 9, No. 1, Jan. 2014, pp. 57-62.

(Continued)

*Primary Examiner* — Mohammad A Sana
(74) *Attorney, Agent, or Firm* — Mark Bergner

(57) ABSTRACT

A computer-implemented system and method combine a plurality of search indexes of a search service. The method may comprise determining a resource utilization indicator value for two or more of the search indexes that correspond to a search body, evaluating the resource utilization indicator values to determine if they exceed a utilization threshold value, and responsive to each of the resource utilization indicator values exceeding the utilization threshold value, merging the two or more search indexes, resulting in a creation of a single search index out of the two or more search indexes while maintaining access rights to content elements relating to the search body.

20 Claims, 8 Drawing Sheets

400

402  DETERMINE A RESOURCE INDICATOR VALUE FOR AT LEAST TWO SEARCH INDEXES

404  EVALUATE THE RESOURCE INDICATOR VALUES AGAINST A THRESHOLD VALUE

406  MERGE THE AT LEAST TWO INDEXES IF BOTH RESOURCE INDICATOR VALUES EXCEED THE THRESHOLD VALUE

(56) References Cited

U.S. PATENT DOCUMENTS

2020/0125674 A1\* 4/2020 Arunski ............... G06F 16/328

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

MERGING SEARCH INDEXES OF A SEARCH SERVICE

BACKGROUND

Disclosed herein is a system and related method for maintaining a search service, and more specifically, to a computer-implemented system and method for combining a plurality of search indexes of a search service.

Managing large amounts of data continues to be a key challenge for individuals as well as enterprises. Often, cloud solutions—either on premise or as a true cloud computing solution—are used to search for content. Thus, cloud services may benefit from a search service to find and retrieve information resources for further use. Such services may typically support multiple tenants by separating and/or organizing information in a tenant specific way. For a search service, this typically implies maintaining one or more search collections per tenant, which itself may put a lot of load on the search service; i.e., thousands of search collections may need to be updated and searched through.

SUMMARY

According to one aspect disclosed herein, a computer-implemented method for combining search indexes of a search service may be provided. The method may comprise determining a resource utilization indicator value for two or more of the search indexes that correspond to a search body, evaluating the resource utilization indicator values to determine if they exceed a utilization threshold value, and responsive to each of the resource utilization indicator values exceeding the utilization threshold value, merging the two or more search indexes, resulting in a creation of a single search index out of the two or more search indexes while maintaining access rights to content elements relating to the search body.

According to another aspect disclosed herein, an index management system for combining search indexes of a search service may be provided. The system may comprise a processor configured to determine a resource utilization indicator value for two or more search indexes that correspond to a search body. The processor may be configured to evaluate the resource utilization indicator values against a utilization threshold value; and responsive to each of the resource utilization indicator values exceeding the utilization threshold value, merge the two or more search indexes, resulting in a creation of a single search index out of the two or more search indexes while maintaining access rights to content elements relating to the search body.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
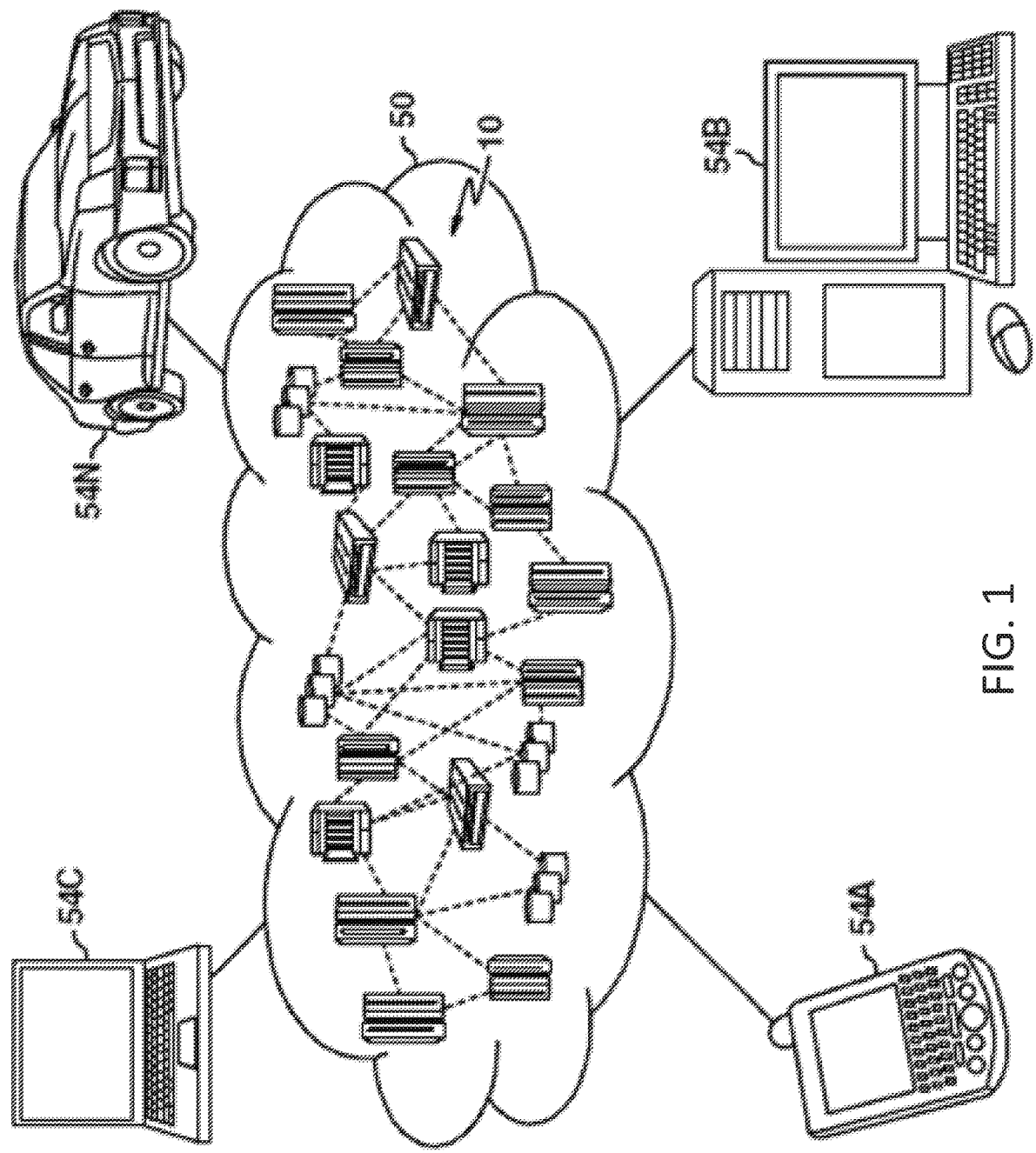
FIG. 1 depicts a cloud computing environment according to an embodiment of the present invention.

In order to deliver satisfactory performance, it may be desirable to have a search service be able to return a list of documents comprising the term a user is looking for in a sub-second response time. Users may not accept significant delays for the search requests. Additionally, the number of search services used increases continuously and exponentially. One of the root causes for this growth may be seen in the increasing use of artificial intelligence and machine learning to enhance existing business applications.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
LTA logging/tracking/audit
PaaS platform as a service
PDA personal digital assistant PLA programmable logic arrays
RAM random access memory
RISC reduced instruction set computer
ROM read-only memory
SaaS software as a service
SLA service level agreement
SOI search optimization service
SRAM static random access memory
WAN wide-area network The following conventions, definitions, terms and/or expressions may be used herein. A tenant may be considered to be an enterprise having a plurality of individual users. The term search service may denote a computer supported tool to identify and retrieve information. Such information may include, but is not limited to, individual documents from a repository of documents, i.e., content items. The repository may be implemented in the form of, e.g., a content management system or a collection of files in the file system. Other options may be possible. The documents may be text documents, however, the search service may also be adapted to search for images (e.g., "search for similar images"), audio files, video files, or any other objects for which search algorithms may be provided.

A search service may provide functionality for searching in unstructured data, like text documents. Search services may provide functionality to create a search index by indexing content items, like text documents. A search index may contain a representation of the content in a representation that is well suited for highly efficient processing by the search service. The search service may provide an API for indexing content items, which may make the content item searchable by the search service. It may also provide a query API which allows a client of a service, or an application, to issue a search query.

A search query may contain a set of query parameters that specify criteria for searching content items, like a set of search terms. The search service may process the query by selecting and ranking a set of content items according to the query. The ranking may determine a scoring or an order of the content items relative to the search query, representative of how relevant a content item is to the query. The query may also comprise parameters for controlling the ranking in a form of a ranking query, a boost query, or a boost function. The search service may also automatically select the heuristics and parameters for the ranking. Ranking may be based on statistics about the search corpus and the search terms, as well as statistics about the occurrence of search terms in specific content items, etc.

Several ranking methods are known, e.g., term frequency-inverse document frequency (tf-idf), which is a numerical statistic that is intended to reflect how important a word is to a document in a collection or corpus. It is often used as a weighting factor in ranking a document's relevancy in search services relative to a given query. The tf-idf value may be increased proportionally to the number of times a word appears in the document and is offset by the frequency of the word in the corpus.

A search service may also manage multiple indexes, i.e., it may be used in a multi-tenant environment, e.g., by creating a separate index for each tenant. Search client services then must correctly select the correct index to use for search requests depending on the tenant context.

A major goal of a search service is to provide fast full text search results. Documents to be searched may be provided to a search service which analyzes the documents and puts the relevant data in a search index. Search indexes may also be used to separate data. In modern multi-tenant content management systems, collections are used to separate data from different tenants.

A search index may be associated with a specific search configuration, comprising multiple configuration settings which control search functionality, behavior and, e.g., the structure of the content items in the index. One may update the configuration parameters through a search service API, or by uploading a set of configuration files to the search service or a file system or a persistent storage the search service is using.

Multi-tenant search services may use different indexes to separate content from different tenants. This may be a simple and clean solution as long as the number of tenants is limited. As soon as the number of separate tenants, and therefore separate indexes, becomes a larger number (like several thousand with search service Solr), this setup may become very resource consuming, as each index may require a separate space in main memory and the handling of such a large number of indexes is a problem for the search service. Beyond a certain number of indexes per Solr deployment, which, dependent on the hardware resource, are usually a few hundreds to a low thousands of indexes, Solr would become inoperable if more indexes were to be added. Therefore, in those scenarios, one approach is to require an additional separate search engine deployment to handle the additional indexes.

The term "search engine" may denote—in the above sense—the heart of the search service performing, according to a specific configuration, an indexing of documents—i.e., identifying potential search terms—as well as performing search requests.

The term "search indexes" may denote a sort of a repository maintaining terms identified during an indexing process, as well as a pointer to the original document. Search indexes may be maintained—e.g., often in the main memory of a computer system—in order to decrease the response time for individual search requests.

The term "search body" may denote the corpus or the entirety of documents accessible by the search service. The search body may logically be split into a plurality of documents groups belonging to—or being owned by—different groups.

The term "content item" may denote the smallest identifiable part in a search body. A content item may be a document, an image, an audio file, a spreadsheet, a map or similar, or combinations thereof.

The term "resource utilization indicator value" may denote a calculated or measured—directly or indirectly—value determined based on consumed computing system resources by a search service, i.e., a search engine in combination with one or more search indexes. With this, it may be possible that the resource utilization indicator value is directed to the resource consumption in respect to one index or a group of indexes. Generally, it may be related to the amount of computing resources in the form of CPU time, main memory used, number of vertical machines required, permanent storage usage, network capacity, and similar parameter values indicating a usage of a computing system.

The term "single search index" may denote that one index may be maintained for more than one tenant (more than one user if the indexes were originally only used by one user). However, the access rights to searchable content items may be maintained as if the originally separated indexes would be used.

The term "access right" may denote a manipulation right to a content item in a content management system or other collection of content items. Access rights may be "read access", "write access", or "delete rights", or a combination thereof. The access right may typically be maintained for a single document. However, it may also be possible to restrict the access right to only parts of the document or groups of documents, i.e., content items.

The term "search index statistics" may denote collected statistics on the index and their use. It may, for example, be possible to query the top terms for a field of choice. If one has an index representing "cars" and one wants to know the top searched car brands, one may query the search engine to turn the list of top terms. In the case of the search engine Solr, one would use a Facet on the content field. Solr would return that it found for example 4530 documents in the index and that "Mercedes" is the top one with 1720 mentions.

The term "search index performance" may be related to consumed system resources based on how many search collections it needs to manage. The more search collections it works with, the more system resources it requires. These resources are e.g., system memory, CPU cycles, and space required for persistent storage with a dependency on the number of search collections available. System memory may be mostly used for search collection-specific caching. Over-average CPU cycles may be required for the process of updating the search collection. The amount of persistent storage capacities may depend on factors like the amount of metadata, a size of the vocabulary, and occurrences of the individual terms spread over the indexed documents.

The result of merging multiple search collections into a single collection will not greatly reduce the CPU power required. However, it will have an influence on required system memory as well as the persisted size of the search collection itself. The size may decrease, for example, because the list of terms in the collection (the vocabulary) is built for all the involved tenants for common use. The required references to the documents where they occur may then be generated in a highly compressed way, thus overall leading to a smaller footprint of the search collection.

The term "allowed search query" may denote a search query being available to a user or a requesting system based on the access rights to a specific content item.

The term "content management system" (CMS) may denote a computer supported system for managing creation and modification of digital content. It may typically support multiple users in a collaborative environment. CMS features may vary widely. Most CMSs include Web-based publishing, format management, history editing and version control, indexing, search, and retrieval. By their nature, content management systems may support the separation of content and presentation. For example, a web content management system (WCM or WCMS) is a CMS designed to support the management of the content of Web pages. Most popular CMSs are also WCMSs. Web content includes text and embedded graphics, photos, video, audio, maps, and program code (e.g., for applications) that displays content or interacts with the user.

The term "tenant" may denote a group of users (e.g., employees of a company) or systems accessing a search service. Modern cloud solutions may be able to serve multiple tenants with one deployment. The group of users may share a common access with specific privileges to the search instance. The service infrastructure and the search service may ensure that tenant specific data may be isolated from other tenants. Typically, client requests and service requests may comprise a tenant identifier of the tenant which is associated with the request, which may allow the service infrastructure component to establish the required context and state for processing the request.

The term "computing resource" and "consumed resources by the search service" may be directly related to performance parameters. Services typically use state-of-the-art software engineering mechanisms like caching, persistent storage, session and state management, and connection and thread pooling, etc. For example, caching improves performance significantly. Usually, the system caches data that was recently used, e.g., while processing recent requests. Since requests are distributed between service instances, the individual service instances normally have different cache entries. In other words, the state of the service instance depends on its individual usage history. Service performance depends on whether data relevant for request processing is available in the cache or not. Thus, performance for processing the same request may differ between individual service instances. It is therefore possible to intelligently select service instances for processing a request.

Generally, system performance depends heavily on the data in the cache. Today, there is no standard for sharing detailed information about cache contents between service instances and service registries. Thus, the information is not available during the service lookup for, e.g., selection of a particular service instance. The index may be viewed as a cache or being held in a cache memory.

The term "mapping layer" may denote a specific functionality layer as part of the index with the dedicated function to maintain the original search semantics access collections and access rights of the originally independent indexes.

The automatic management and maintenance of search indexes may be enhanced significantly by reducing the computational effort to maintain a large number of indexes for a search service. By continuously determining which indexes relating to a given search corpus may be combined with another search index, the computational load to the existing hardware and middleware infrastructure may be reduced significantly. The system behavior may be individually tuned, e.g., by constantly adapting the index integration characteristics.

Over and above pure performance aspects, also the integrity of a combined search index, user privileges—in particular, access rights—search semantics, and other access conditions to the content items of the search body may be maintained. This may be an important aspect because such services may be used across enterprises or, if used within the same enterprise, across different departments requiring clear responsibilities with respect to a document access.

As an example, normally, a research department may not have access to financial planning documents of the controller department and vice versa. As another example, large parts of an organization may not have access to human resources documents due to privacy regulations. However, a content management system may be enabled to manage and control enterprise documents across departments.

According to one or more embodiments, the method may comprise maintaining, for the single search index, at least one of search semantics and allowed search queries. Thus, the amount of data to be managed relating to indexes may be reduced significantly while access rights and other user or tenant dependent characteristics of the originally separated search indexes may also be maintained in a combined search index.

According to one or more embodiments of the method, the search body may be a portion (or whole) of a content management system used by a plurality of tenants—in particular user groups—wherein, as a start set-up, one index per tenant may be maintained. However, over time, the number of indexes may change to arrive at a constantly emerging and changing content management system allowing a constantly optimized search index strategy.

The number of indexes may grow because the index size per tenant may grow over a preset threshold value. Such a scenario may occur if a tenant may be seen as a plurality of individual users. In another scenario, a tenant may be an individual user. In such a scenario, it may be more likely that the number of indexes may be reduced over time in order to maintain a manageable system.

According to one or more embodiments of the method, the single search index may also comprise at least one data set out of the group comprising access conditions and data item owner information. This may mean that the access conditions—e.g., access rights to individual content items—and data item ownership information may also be merged as part of the merging process of two originally independent indexes. However, the access conditions and the data item ownership information may have to be maintained in the merged index.

According to one optional embodiment of the method, the single search index may comprise a mapping layer for at least one of the access rights, access conditions, and data item owner information. This may have the advantage that the access rights, access conditions, and related data item ownership information may be maintained separately, such that in case the index may be split again, this meta-level information may also be split accordingly.

According to one or more embodiments of the method, the resource utilization indicator value may be indicative of a resource usage of at least one resource selected out of the group including, but not limited to, a processor, random access memory, and long-term memory. However, other performance parameters may also be used, which may enable an assessment about a response time of the related search service. One other example may be the network capacity required to access distributed data sources in order to generate a response to a request against the search service.

According to one or more embodiments, the method may also comprise merging the at least two indexes and creating the single search index if the number of indexes exceeds a threshold value. Such a process may maintain the total number of search indexes relating to the search service under a critical value. Because such indexes are often maintained in memory, the total amount of search index information in the main memory of a computer system may exceed the available physical memory, such that swapping mechanisms may have to be activated. This may be a reason for a severely reduced search response time, which may have to be avoided. This problem may be addressed directly by monitoring that the number of indexes does not exceed a threshold value (max threshold).

According to one or more embodiments, the method may also comprise merging the at least two indexes and creating the single search index for those indexes having equal search terms in a search term list of predefined length. For example, those search indexes may be merged for which the top number of search terms—e.g., the top ten search terms—may be identical. If the top search terms are identical, this may mean that the related indexes may have a similar structure so that a merge of these two indexes may reduce significantly the computational power required for the search service.

According to a further advantageous embodiment, the method may also comprise merging the at least two indexes and creating the single search index for those indexes having a predefined percentage—e.g., 80%—of equal search terms in a search term list of predefined length and sorted by occurrence count (i.e., the focus is on the list of the top n most popular terms). This embodiment may be a derived version of the embodiment just discussed above. The now proposed embodiment may allow a better fine tuning of the determination process whether the two indexes should be merged. Additionally, the parameter for this determination may be determined dynamically.

According to one or more embodiments of the method, the merging of the at least two indexes may only be performed if a predefined minimum number of search indexes is exceeded. Hence, as long as there is no danger that system resources are used too intensively or that a system overload may be provoked, it may not be necessary to initiate an index merger process at all. The merging of two indexes may also utilize system resources which may be saved for other purposes—e.g., faster response times—on a more distributed set of indexes.

According to one or more embodiments of the method, the merging of the at least two indexes may only be performed if the at least two search indexes have the same search configuration. In such a situation, the effort to integrate the two indexes may result in a reduced required computing capacity. It may also mean that the two indexes to be merged are not only similar in structure, but also have similar content, meaning that a merger of the two indexes may save index space and maintain or increase response times of the search service.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
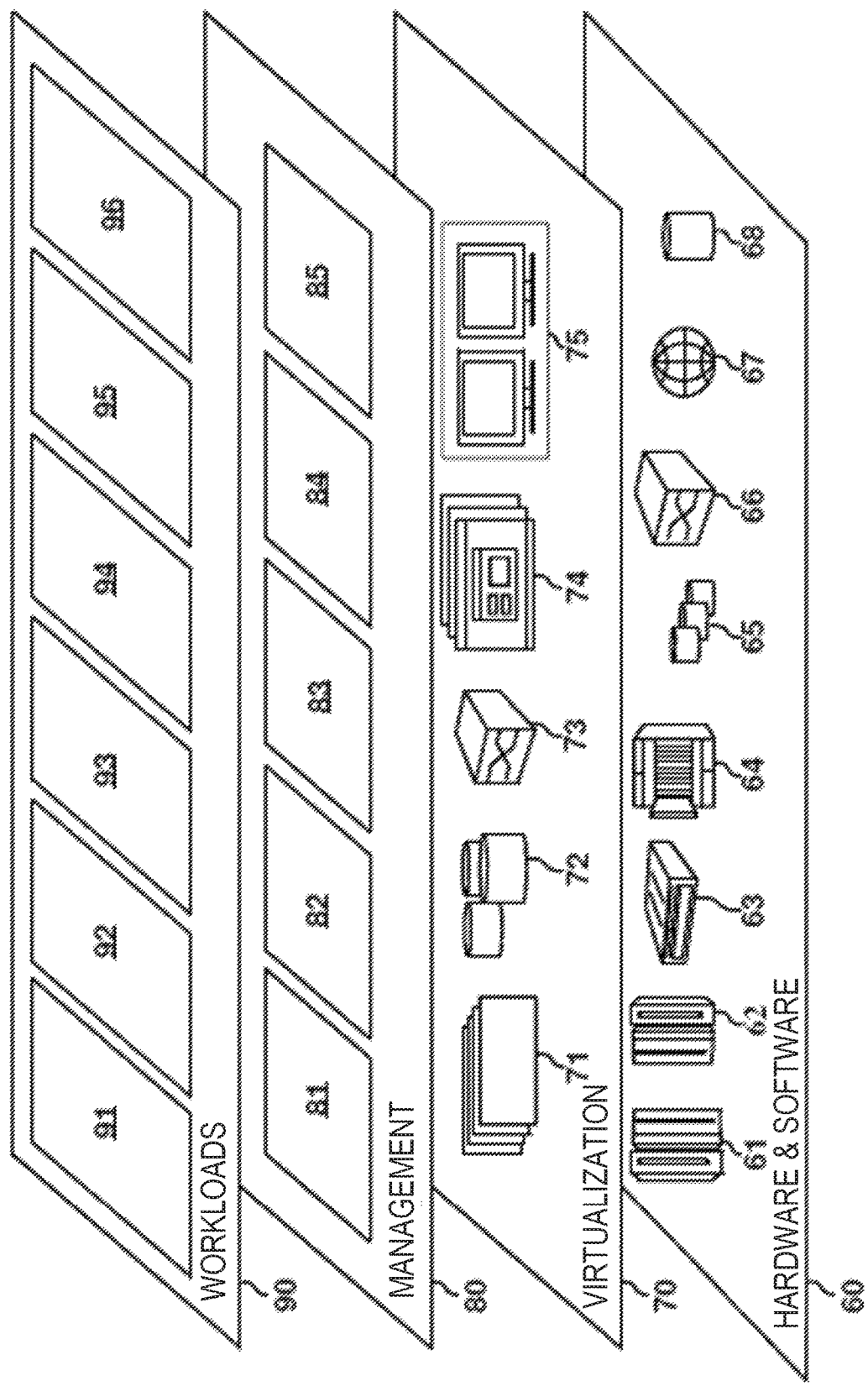
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
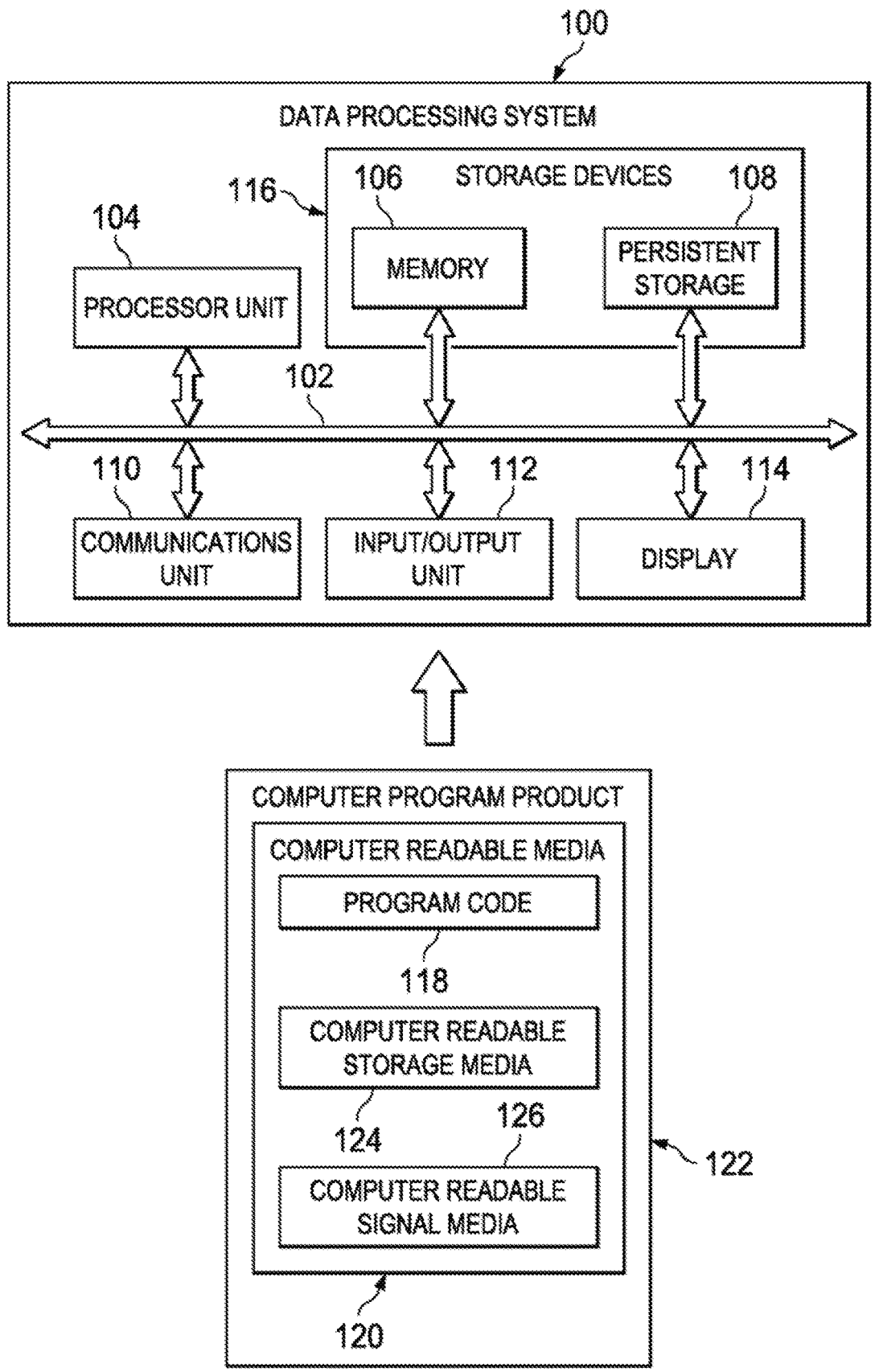
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

Search Indexes

Figure 4:
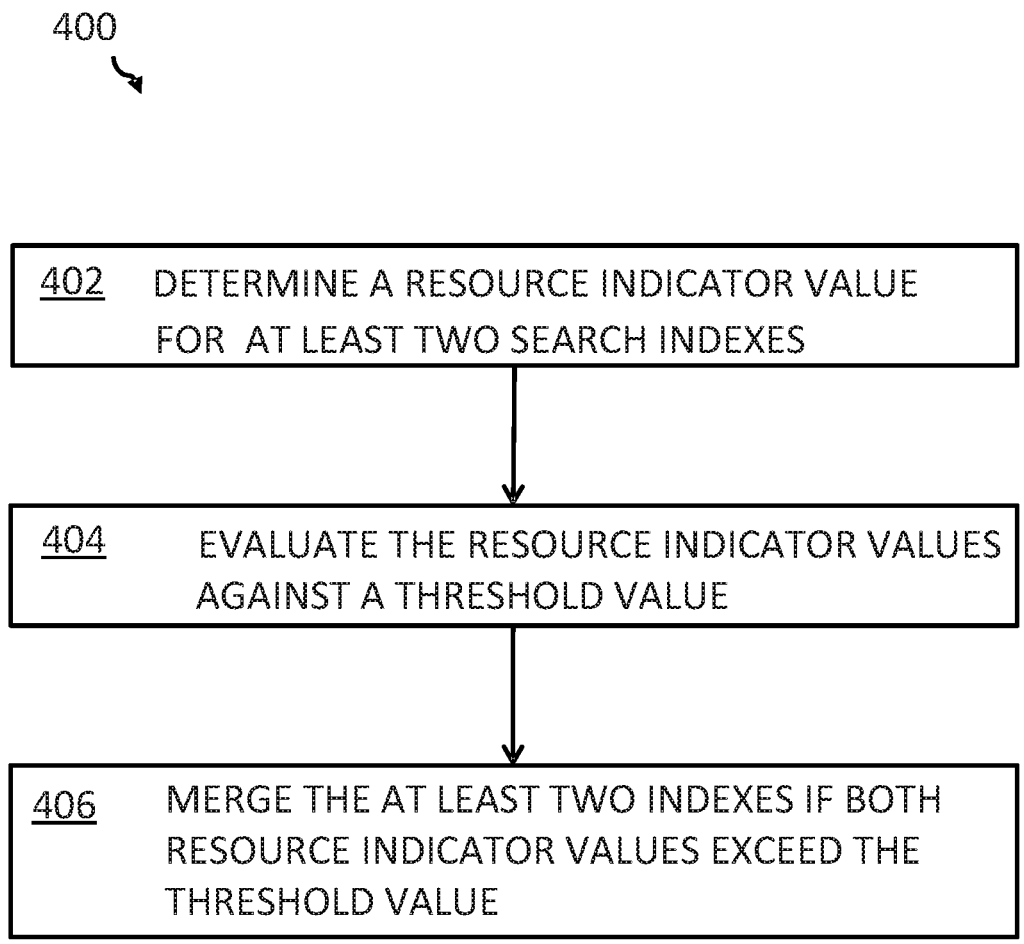
FIG. 4 is a flowchart illustrating one or more embodiments of a computer-implemented method for combining a plurality of search indexes of a search service.
Figure 5:
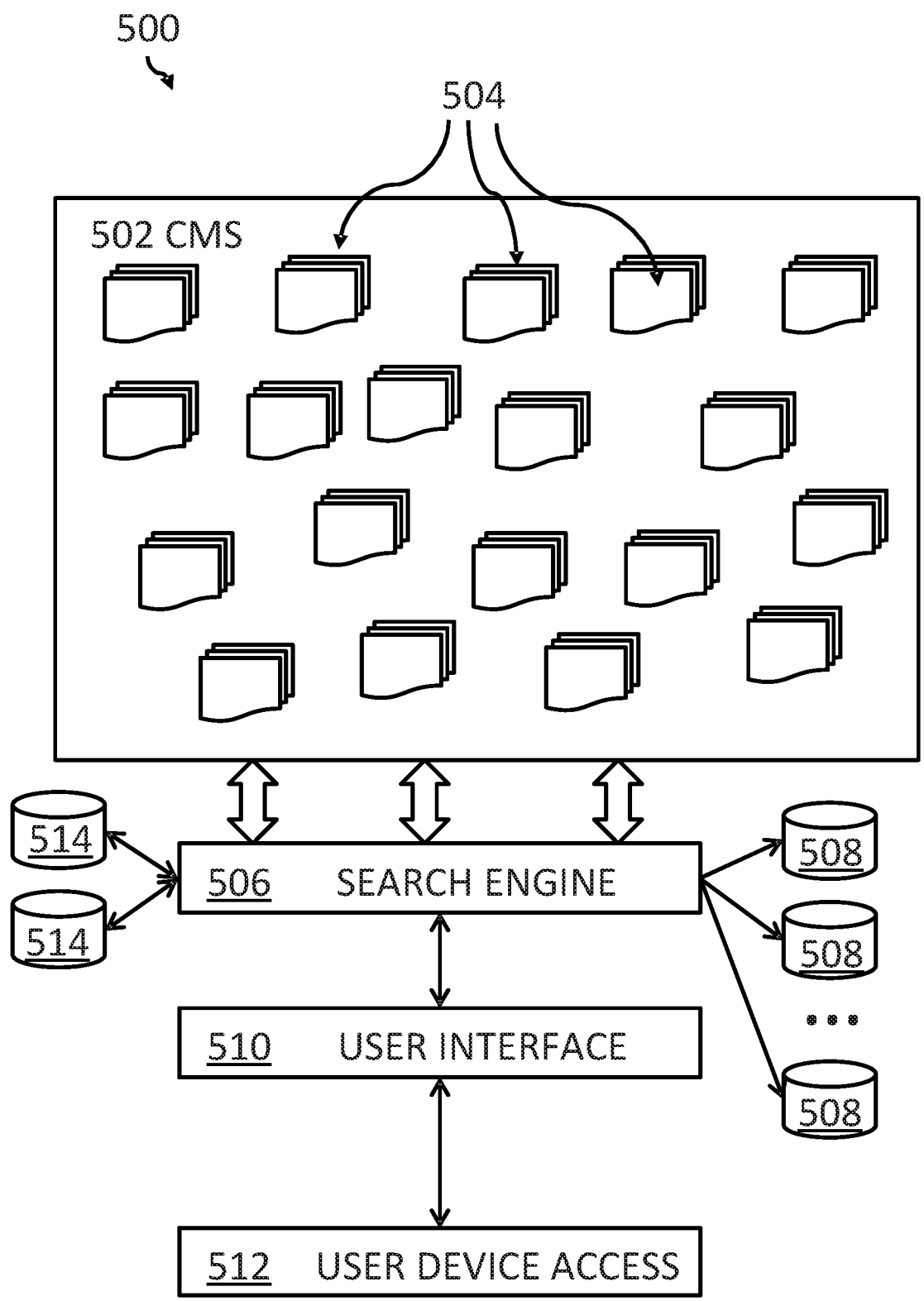
FIG. 5 is a block diagram of one or more embodiments of a search service system.

FIG. 4 is a flowchart of an example of one or more embodiments of a computer-implemented process 400 for combining a plurality of search indexes of a search service. This process 400 may be performed on a CMS 502 (FIG. 5, discussed below). The search service may comprise a search engine and at least two search indexes relating to a search body, in particular, the CMS 502. Each of the search indexes comprises content items. The method comprises, in operation 402, determining a resource utilization indicator value for each of the at least two search indexes, in operation 404, evaluating the resource utilization indicator values against a utilization threshold value, and, in operation 406, merging the at least two indexes if each of the resource utilization indicator values exceed the utilization threshold value. Thereby, a single search index is created out of the at least two indexes while maintaining access rights to content elements relating to the search body.

FIG. 5 is a block diagram of an example search index system 500 for performing one or more of the disclosed methods according to one or more embodiments. The search index system 500 may be in a form of, for example, the DPS 100 discussed above, and may comprise the CMS 502 that may be used to manage and maintain a plurality of content items 504 stored in a storage system in a storage device, such as the storage device 116 discussed above. In order to search and identify particular content items 504, a search engine 506 may be utilized to retrieve content items 504. The search engine may run on a processor unit, such as the processor unit 104 discussed above.

A plurality of tenants—each including a plurality of users—may each have individual access to the content items 504 in the CMS 502. The search engine 506 may organize the retrieval process for the content items 504 in the CMS 502 using a plurality of indexes 508, which may also be stored in the storage devices 116. In one or more embodiments, it may be useful to maintain one index per user or alternatively, one index per user group (e.g., per tenant). On the other side, the search engine 506 may maintain information about search configurations and search collections 514, either separate from the search indexes 508 or as part of them. Here, the search configuration and search collections 514 are shown using separate storage devices, such as storage devices 116. A user interface 510, such as a display 114 and input/output unite 112 may provide access to the search engine 506 and may be used as a front-end for a user device access 512.

Figure 6:
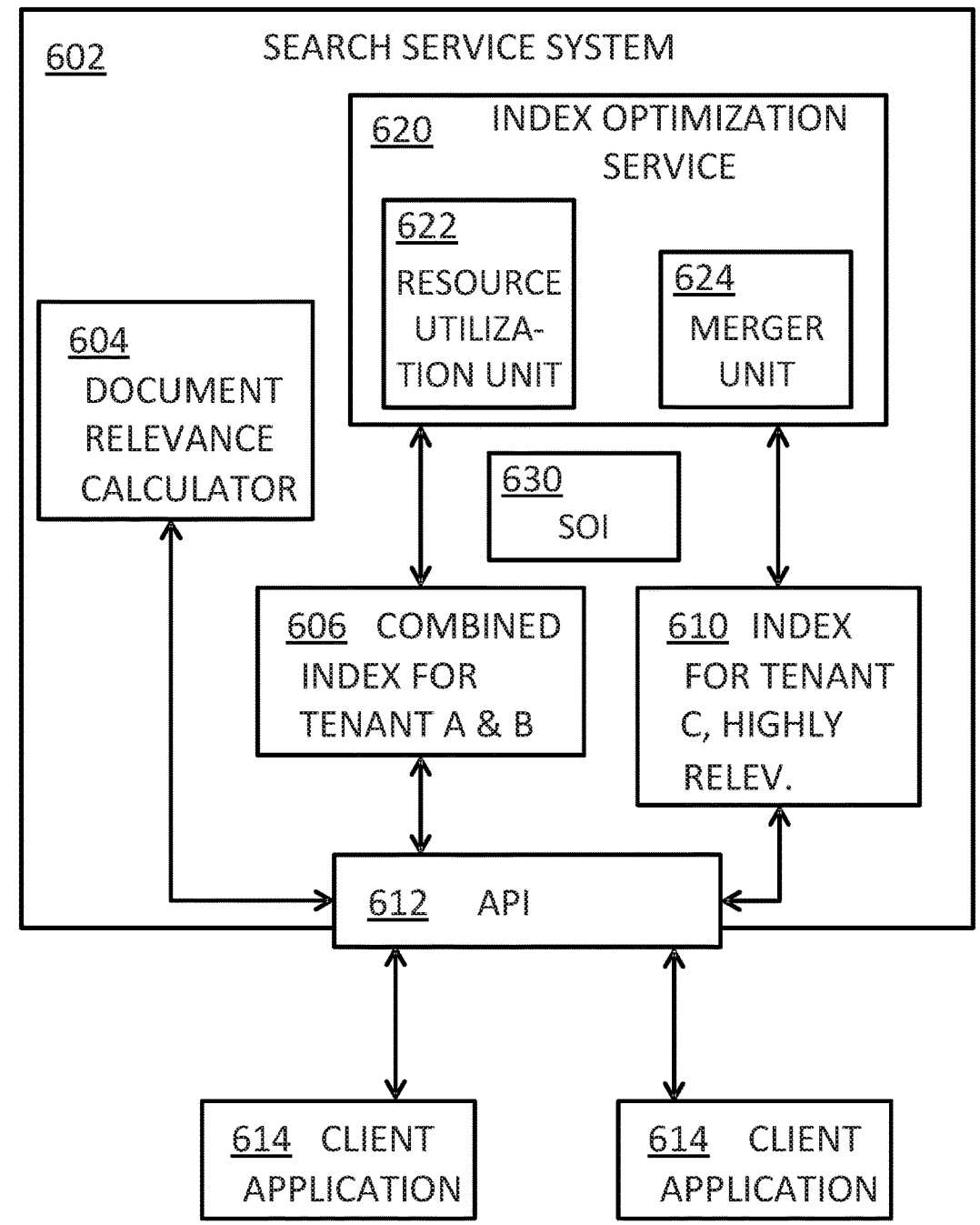
FIG. 6 is a block diagram illustrating components of one or more embodiments of a search service system.

FIG. 6 is a block diagram 600 illustrating example components of a search service system 602 according to one or more embodiments. The search service system 602 may run within the context of the search index system 500, which may be implemented in a form of the DPS 100 discussed above. An index optimization service 620 run on the processor unit 104 and may check, in, e.g., configurable intervals, the number of indexes 508 in the system 500. An administrator may configure two threshold values: (i) a maximum threshold value defining the number of indexes managed by the search service that will cause the index optimization service 620 to consolidate (i.e., merge) indexes; (ii) a minimum threshold value defining the number of indexes managed by the search service—the index optimization service 620 stops consolidating, (i.e., merging) indexes as soon as this threshold is reached.

The index optimization service 620 may determine the number of indexes managed by the search service. If that number is larger than the defined maximum threshold value, the index optimization service 620 may start with loading all configuration data for all indexes managed by the search service and comparing the individual configuration settings. Indexes with identical or similar configuration settings (e.g., identical/similar schemas, analyzes, tokenizers, and filters) may be merged. If there are fewer indexes than defined by the minimum threshold, the index optimization service 620 may stop until the next defined interval. If there are still more indexes managed by the search service than defined by the minimum threshold value, the index optimization service 620 may reduce a match threshold value for an individual configuration setting by a predefined percentage (e.g., 1%), merge (i.e., consolidate) identified indexes (like indexes that are a sub- or a superset of each other), and finally check the number of remaining indexes in the system. The index optimization service 620 may continue this process by reducing the percentage value of required configuration matches until the minimum threshold value is reached.

In an alternative implementation, an individual weight factor may be assigned to each individual index configuration setting to indicate that having matching values for some specific configuration settings are more important than others (e.g., index for tenant C, "highly relevant" 610). The importance may be determined by the document relevance calculator 604. Reference numeral 606 indicates a combined index for tenants A and B. The API 612 may allow the clients 614—endpoint systems or applications on other servers—to access the search service system 602.

Furthermore, in one or more embodiments, the search service may use statistical data collected on each search index as an alternative criteria for finding indexes that may be merged and provide at the same time the best possible search performance, as well as the most relevant documents back to the requesting user or system. In this exemplary embodiment, the index optimization service 620 may also comprise a resource utilization unit 622 and a merger unit 624. The resource utilization unit 622 may be used to determine a resource utilization indicator value for each of the search indexes, and evaluate the resource utilization indicator values against a utilization threshold value. The merger unit 624 may, responsive to each of the resource utilization indicator values exceeding the utilization threshold value, merge the indexes, resulting in a creation of a single search index out of the search indexes while maintaining access rights to content elements relating to the search body.

Figure 7:
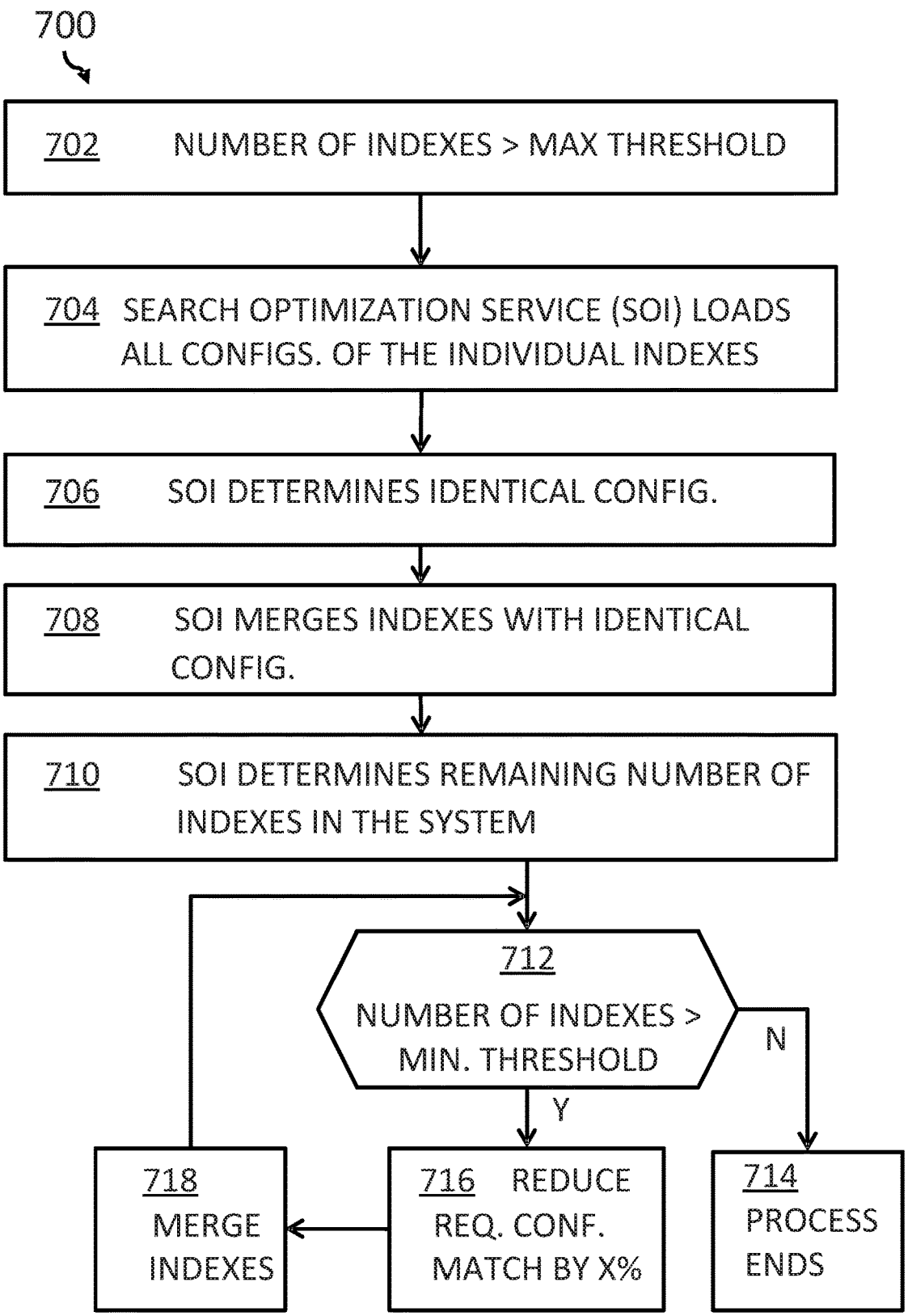
FIG. 7 is a flowchart of one or more embodiments of a process disclosed herein.

FIG. 7 is a flowchart of a process 700 according to one or more embodiments disclosed herein and illustrates a context for, e.g., the system shown in FIG. 6. The process 700 may be performed in the processor unit 104, described above. In operation 702, it is determined whether the number of indexes maintained is above the maximum threshold value. If that is the case, then in operation 704, an SOI 630 may load all configurations of the individual indexes. Next, in operation 706, the SOI 630 may determine identical configurations of the related indexes and merges, in operation 708, two indexes with the identical configurations.

In a next operation 710, the SOI 630 determines the remaining number of indexes in the system. In operation 712, if the number is above a minimum threshold value (operation 712: Y) then, in operation 716, the required confidence match value or similarity index is reduced by a predefined percentage (x %) and, in operation 718, the two indexes are merged again if the two indexes in question are conformant with this requirement. After that, the process returns to operation 712. If the number is not above a minimum threshold value (operation 712: N), then in operation 714, the process ends.

Figure 8:
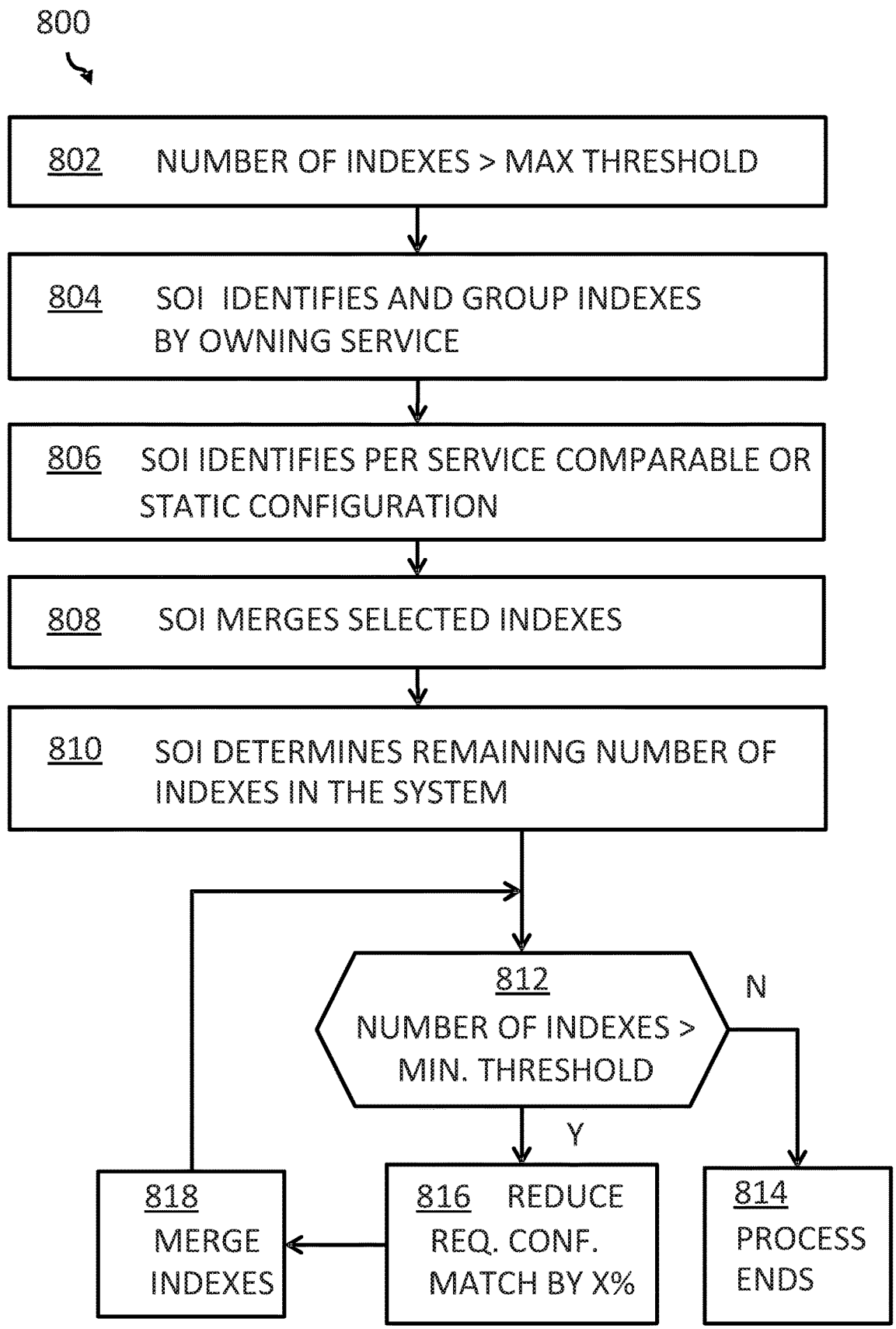
FIG. 8 is a flowchart of one or more embodiments of a process disclosed herein.

FIG. 8 is a flow chart of an example process 800 according to one or more embodiments. The process 800 may be performed in the processor unit 104, described above. In operation 802, it is first determined whether the number of indexes is above a maximum threshold value. In operation 804, the SOI 630 may identify and group indexes by the owning service. In operation 806, the SOI 630 may identify per service comparable or static configurations. In operation 808, the SOI 630 may merge the selected indexes. In operation 810, the SOI 630 may determine the remaining number of indexes in the system. In operation 812, if the number is greater than the minimum threshold value (operation 812: Y), then, in operation 816, the required conformity or similarity between the two indexes may be reduced by a predefined percentage number, and then, in operation 818, the indexes may be merged, and the process may repeat at operation 812. If the number of indexes is not greater than the minimum threshold (operation 812: N), then, at operation 814, the process may end.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for combining search indexes of a search service, the method comprising:
    determining a resource utilization indicator value (RUIV) for each of two or more search indexes that correspond to a search body, wherein the RUIV denotes a calculated or measured value that is directly or indirectly determined based on consumed computer system resources by the search service;

evaluating the RUIVs to determine if they exceed a utilization threshold value; and responsive to each of the RUIVs exceeding the utilization threshold value, merging the two or more search indexes, resulting in a creation of a single search index out of the two or more search indexes while maintaining access rights to content elements relating to the search body.

2. The method according to claim 1, further comprising also maintaining for the single search index at least one entity selected from the group consisting of: search semantics and allowed search queries.

3. The method according to claim 1, wherein:
the search body is a portion of a content management system used by a plurality of tenants; and
as a start set-up, one index per tenant is maintained.

4. The method according to claim 1, wherein the single search index also comprises a data set from the group consisting of access conditions and data item owner information.

5. The method according to claim 1, wherein the single search index comprises a mapping layer selected from the group consisting of access rights, access conditions, and data item owner information.

6. The method according to claim 1, wherein the resource utilization indicator value indicates a resource usage of at least one resource selected from the group consisting of a processor, a random access memory, and a long-term memory.

7. The method according to claim 1, further comprising:
responsive to a number of indexes exceeding a threshold value, merging the search indexes and creating the single search index.

8. The method according to claim 1, further comprising:
merging the search indexes and creating the single search index for those indexes having equal search terms in a search term list of predefined length sorted by occurrence count.

9. The method according to claim 1, further comprising:
merging the search indexes and creating the single search index for those indexes having a predefined percentage of equal search terms in a search term list of predefined length.

10. The method according to claim 1, wherein the merging of the search indexes is only performed for at least one of the following:
responsive to a predefined minimum number of search indexes being exceeded; or
responsive to the search indexes having a same search configuration.

11. An index management system for combining search indexes of a search service, the index management system comprising:
a processor configured to:
determine a resource utilization indicator value (RUIV) for each of two or more search indexes that correspond to a search body, wherein the RUIV denotes a calculated or measured value that is directly or indirectly determined based on consumed computer system resources by the search service;
evaluate the RUIVs against a utilization threshold value; and
responsive to each of the RUIVs exceeding the utilization threshold value, merge the two or more search indexes, resulting in a creation of a single search index out of the two or more search indexes while maintaining access rights to content elements relating to the search body.

12. The system according to claim 11, wherein the processor is further configured to maintain, for the single search index, an element selected from the group consisting of search semantics and allowed search queries.

13. The system according to claim 12, wherein the resource utilization indicator value is indicative of a resource usage of at least one resource selected out of the group of a processor, random access memory, and long-term memory.

14. The system according to claim 11, wherein:
the search body is a portion of a content management system used by a plurality of tenants; and
as a start set-up, one index per tenant is maintained.

15. The system according to claim 11, wherein the single search index also comprises at least one data set selected from the group consisting of access conditions and data item owner information.

16. The system according to claim 11, wherein the single search index comprises a mapping layer selected from the group consisting of access rights, access conditions, and data item owner information.

17. The system according to claim 11, wherein the processor is further configured to merge, responsive to the number of indexes exceeding a threshold value, the search indexes and create the single search index.

18. The system according to claim 11, wherein the processor is further configured to merge the search indexes and create the single search index for those indexes having equal search terms in a search term list of predefined length sorted by occurrence count.

19. The system according to claim 11, wherein the processor is further configured to merge
the search indexes and create the single search index for those indexes having a predefined percentage of equal search terms in a search term list of predefined length.

20. A computer program product for combining search indexes of a search service, the computer program product comprising a computer readable storage medium having computer-readable program code embodied therewith to, when executed on a processor:
determine a resource utilization indicator value (RUIV) for each of two or more search indexes that correspond to a search body, wherein the RUIV denotes a calculated or measured value that is directly or indirectly determined based on consumed computer system resources by the search service;
evaluate the RUIVs against a utilization threshold value;
responsive to each of the RUIVs exceeding the utilization threshold value, merge the two or more search indexes, resulting in a creation of a single search index out of the two or more search indexes while maintaining access rights to content elements relating to the search body.

* * * * *